United States Patent

Knutson

[15] 3,661,696
[45] May 9, 1972

[54] ETHYLENE-VINYL ACETATE COPOLYMER ADHESIVE COMPOSITION AND METHOD OF PREPARATION

[72] Inventor: Gaylen M. Knutson, Yorba Linda, Calif.

[73] Assignee: Union Oil Company of California, Los Angeles, Calif.

[22] Filed: Sept. 30, 1970

[21] Appl. No.: 77,018

[52] U.S. Cl. .............................161/204, 156/332, 161/208, 161/218, 161/251, 161/254, 260/29.6 WB, 260/29.6 WA, 260/878
[51] Int. Cl. ...................C08f 15/02, C08f 37/18, C08f 1/13
[58] Field of Search ..........260/29.6 WB, 29.6 WA, 29.6 RB, 260/897, 87.3

[56] References Cited

UNITED STATES PATENTS

| | | | |
|---|---|---|---|
| 2,850,468 | 9/1958 | Giggey | 260/17.4 |
| 2,976,203 | 3/1961 | Young et al. | 154/140 |
| 3,010,929 | 11/1961 | Jones | 260/29.6 |
| 3,213,051 | 10/1965 | Pink | 260/29.6 |
| 3,265,654 | 10/1966 | Glabitsch et al. | 260/29.6 |
| 3,325,460 | 6/1967 | Schellenberg et al | 260/87.3 |
| 3,347,811 | 10/1967 | Bissot | 260/29.6 |
| 3,355,322 | 11/1967 | Worrall et al. | 117/126 |
| 3,532,658 | 10/1970 | Gintz | 260/29.6 |
| 3,534,009 | 10/1970 | Beresniewicz et al. | 260/87.3 |

*Primary Examiner*—William H. Short
*Assistant Examiner*—E. A. Nielsen
*Attorney*—Milton W. Lee, Richard C. Hartman, Lannas S. Henderson, Dean Sandford and Robert E. Strauss

[57] ABSTRACT

A process for the production of an aqueous emulsion of an ethylene-vinyl acetate copolymer is disclosed wherein the polymerization is performed in the presence of a preformed seed emulsion and a minor amount, from 1.5 to 6 weight percent, of a protective colloid comprising a mixture of fully and partially hydrolyzed polyvinyl acetate. The seed emulsion is comprised of from 25 to 63 weight percent of ethylene-vinyl acetate copolymers which contain from 1 to 20 weight percent ethylene and from 1 to 5 weight percent of a partially hydrolyzed polyvinyl acetate. The polymerization is performed under an ethylene pressure of from 100 to 1,000 psig., sufficient to incorporate from 1 to 20 weight percent ethylene in the final copolymer product and carried out until the total free monomer content of the emulsion is maintained below about 1 weight percent. Conventional free radical initiation of the polymerization reaction is used. The resultant emulsion can be used as an adhesive since films formed therefrom exhibit a high degree of adhesiveness.

16 Claims, No Drawings

ETHYLENE-VINYL ACETATE COPOLYMER ADHESIVE COMPOSITION AND METHOD OF PREPARATION

DESCRIPTION OF THE INVENTION

This invention relates to an improved adhesive composition and method for making the same. More particularly, this invention relates to an adhesive composition having improved adhesion to vinyl plastics and to a process for making the same.

Recent commercial applications of adhesives have increased the demand for adhesives having quite selective properties. A few of these properties, which many applications now require, include high moisture resistance, low flammability, low biological toxicity, etc. In addition it is generally advantageous to select adhesives which do not crystallize and become brittle and which can be applied at ambient temperatures.

A particularly desirable property which has heretofore been difficult to obtain with conventional adhesives is a good adhesion to vinyl plastics. The development of adhesives having this property has attracted considerable attention because of the ubiquity of the vinyl plastics, such as polyvinyl chloride and polyvinyl acetate.

Many adhesives possess some of the above desired properties but are lacking in others. For example, proteinaceous adhesives generally have good adhesion and can be applied at ambient temperatures but are highly susceptible to moisture and thus are quite inadequate in a moist environment. Another common adhesive which has good adhesional properties is a solution of polyacrylates in an organic solvent; however, this adhesive is usually flammable and toxic and exhibits a detrimental effect on plastics by causing swelling or solvation. Another adhesive which has good moisture resistance and low flammability is an ethylene-vinyl acetate copolymer having high ethylene content. This adhesive, however, must be melted before its application to the desired surfaces. Many surfaces, such as paper products and some plastics, cannot be heated sufficiently without partial or total destruction of the product or surface. Attempts to emulsify the high ethylene content copolymers to provide a latex adhesive, which can be applied at ambient temperatures, have been relatively unsuccessful.

Recently, an emulsion of an ethylene-vinyl acetate copolymer having a low ethylene content and containing a polyvinyl alcohol protective colloid has been introduced into the adhesives market. This emulsion is suitable for many purposes, however, films from the emulsion lack adequate adhesion to vinyl plastics. The need therefore still exists for an adhesive for vinyl plastics which possesses the aforementioned properties. The adhesive should also have a low biological toxicity, and should not cause swelling or solvation of the plastic products.

Accordingly, an object of this invention is to provide an improved adhesive.

Another object of this invention is to provide a latex of an ethylene-vinyl acetate copolymer having improved adhesional properties.

Another object of this invention is to provide an adhesive emulsion that can be applied at ambient temperatures and that has an excellent adhesion to vinyl plastics.

A further object of this invention is to provide an improved method of making the aforementioned emulsion.

Other objects and advantages of this invention will be apparent to those skilled in the art from the description thereof which follows.

The aforesaid objects and their attendant advantages can be attained with an aqueous ethylene-vinyl acetate copolymer emulsion having a low ethylene content and formed by the emulsion polymerization of ethylene and vinyl acetate in the presence of a seed emulsion and a small amount of a polyvinyl alcohol mixture consisting of fully and partially hydrolyzed polyvinyl acetate. The seed emulsion comprises an aqueous emulsion of an ethylene-vinyl acetate copolymer having a low ethylene content and copolymerized in substantially the same manner as the copolymer in the final adhesive emulsion. The polyvinyl alcohol is a commercially available material and is prepared by hydrolysis of polyvinyl acetate. It is available in varied degrees of hydrolysis and is commonly referred to as partially and fully hydrolyzed polyvinyl alcohol. The polymer is a polyvinyl acetate having a varied degree of hydrolysis of the acetate groups to hydroxyl groups and will be referred to hereinafter as a hydrolyzed polyvinyl acetate with a specified degree of hydrolysis of the acetate groups. While the manner in which the seed emulsion functions is not known with certainty, it is known that the copolymerization of ethylene and vinyl acetate in the presence of the seed emulsion substantially improves the adhesion strength of the resulting emulsion. The emulsions prepared by the practice of this invention have been found to exhibit excellent adhesion to vinyl plastics, can be applied at ambient conditions, are relatively moisture resistant, have a low toxicity and do not crystallize or become brittle. In addition, the emulsions are relatively grit-free, i.e., do not form visible macroparticles in thin films of the emulsion upon drying.

PREPARATION OF THE SEED EMULSION

The seed emulsion is prepared by an emulsion copolymerization technique and comprises dispersing in an aqueous medium having a pH of about 3 to 9 and preferably between about 4 to 8, a major portion of vinyl acetate and a minor portion of partially hydrolyzed polyvinyl acetate. The dispersion is contacted with a free radical precursor as the polymerization initiator and ethylene under a pressure of about 100 to 1,000 psig. The polymerization is initiated by heating the medium to a temperature of about 100° to 200° F., sufficient to decompose the precursor and release free radicals. The copolymerization is allowed to proceed while agitating the aqueous medium to maintain the dispersion until the free or unreacted vinyl acetate monomer in the emulsion is reduced to less than 5 weight percent and preferably less than 1 weight percent of the seed emulsion.

In a preferred embodiment the vinyl acetate, polymerization initiator and partially hydrolyzed polyvinyl acetate compounds are continuously added to the reaction during the copolymerization reaction. By adding the vinyl acetate monomer concurrently with the copolymerization reaction, resulting copolymers can have very high molecular weights. Thus in this embodiment the copolymerizing ethylene and vinyl acetate monomers are continuously added onto the ends of primortal copolymers and frequently form copolymers having an average length within the range of from about 0.4 to 2.5 microns. Preferably the copolymerization reaction is conducted so that the seed emulsion containing ethylene-vinyl acetate copolymers has an average length within about 0.5 to 2.0 microns.

The amount of vinyl acetate which is introduced into the polymerization is selected so that the seed emulsion contains between about 25 and 65 weight percent of the ethylene-vinyl acetate copolymer and more preferably between about 30 and 60 weight percent copolymer.

The seed emulsion should contain between about 1 and 5 weight percent of partially hydrolyzed polyvinyl acetate to impart the desired degree of adhesion to the product adhesive. In addition, the degree of hydrolysis of the partially hydrolyzed polyvinyl acetate significantly affects the ability of the seed emulsion to impart the desired adhesiveness to the final adhesive emulsion at elevated temperatures. Generally the degree of hydrolysis can vary from 50 to 95 percent, preferably from 80 to 95 percent of the acetate groups, and excellent results can be achieved with polyvinyl acetate that has 87 to 90 weight percent of its acetate groups hydrolyzed to hydroxyl groups. The partially hydrolyzed polyvinyl acetate component should also exhibit a viscosity of about 2 to 80 centipoises and preferably about 3 to 45 centipoises for a 4 weight percent aqueous solution at a temperature of 20°C. as determined by the Hoeppler falling ball method. Exemplary of the partially hydrolyzed polyvinyl acetate component include ELVANOL 51–05, a low molecular weight, 87 to 89 percent hydrolyzed polyvinyl acetate, and ELVANOL 52–22, an intermediate molecular weight, 87 to 89 percent hydrolyzed polyvinyl acetate, which are marketed by E. I. duPont de Nemours.

The copolymerization reaction is conducted so that the amount of ethylene in the resulting seed copolymer is maintained between about 1 and 20 weight percent and preferably between 7 and 18 weight percent of resulting copolymer. The ethylene content can be controlled by regulating the process conditions during the polymerization reaction, such as the ethylene partial pressure, the temperature, the vinyl acetate addition rate to the reactor or the amount of polymerization initiator employed.

PREPARATION OF THE ADHESIVE EMULSION

The adhesive emulsion is prepared by emulsion polymerization. In this polymerization, vinyl acetate, a polyvinyl alcohol mixture and a portion of the seed emulsion are emulsified in an aqueous medium having a pH between about 3 and 9. A free radical precursor is incorporated in the emulsion which is contacted with ethylene under pressure and the emulsion is heated to decompose the precursor and release free radicals which initiate copolymerization of the ethylene and vinyl acetate monomer within the emulsion. It has been found that the copolymerization of ethylene and vinyl acetate in the presence of the aforementioned seed emulsion and the polyvinyl alcohol mixture results in a product emulsion having the desired properties, including excellent vinyl adhesion.

The copolymerization of ethylene and vinyl acetate is conducted so that the amount of ethylene in the copolymer is maintained from 1 to about 20 weight percent and preferably between about 5 and 17 weight percent of the copolymer. The ethylene content in the copolymer can be controlled by regulating the process conditions during the polymerization reaction in the same manner as disclosed supra in the preparation of the seed emulsion, such as by controlling the ethylene partial pressure, the temperature, the vinyl acetate addition rate to the reactor or the amount and type of polymerization initiator employed. The low ethylene content allows the product adhesive to be formed into a stable emulsion so that it can be applied to various surfaces at low or ambient temperatures. Ethylene contents above 20 weight percent are undesirable for emulsion applications as described in this invention since such polymers generally have too low a molecular weight and form adhesives having a low cohesive strength. The cohesive strength is a measure of the polymer strength and a low cohesive strength connotes that only a small force is necessary to cleave the polymer.

The amount of seed emulsion charged to the reactor will vary over a wide range depending upon the reaction conditions and the selected adhesive emulsion contents. Generally the amount of seed emulsion ranges from 5 to about 50 weight percent and preferably between about 5 and 30 weight percent of the adhesive emulsion product. It has been found, for example, that an improved adhesive having excellent vinyl adhesion can be prepared when a seed emulsion of from 10 to 25 weight percent is employed.

The amount of vinyl acetate charged to the reactor is dependent upon the desired solids content of the emulsion, but generally ranges from 25 to 60 weight percent of the emulsion. The amount of vinyl acetate charged to the reactor is further dependent upon the amount of seed emulsion which is employed. For example, as the amount of seed emulsion charged to the reactor increases the amount of vinyl monomer charged thereto is proportionally decreased. The following Table I illustrates the amount of monomer which can be employed in the practice of this invention for various ranges of seed emulsion charged to the reactor.

TABLE I

| Seed Emulsion (Weight Percent) | Vinyl Acetate (Weight Percent) |
| --- | --- |
| 5–10 | 30–60 |
| 10–30 | 25–55 |
| 30–50 | 5–35 |

The polyvinyl alcohol mixture has been found to impart a substantial improvement to the adhesion of films formed from the emulsion to vinyl plastics. The maximum degree of adhesion of such films is achieved when between about 1.5 and 6 weight percent of the alcohol mixture is added to the product emulsion. This polyvinyl alcohol does not include the polyvinyl alcohol (partially hydrolyzed polyvinyl acetate) originally within the seed emulsion and hence the total polyvinyl alcohol in the final emulsion is the cumulative amount of the polyvinyl alcohol mixture added to the product emulsion plus the amount of polyvinyl alcohol originally within the seed emulsion.

The polyvinyl alcohol mixture is a combination of partially hydrolyzed and fully hydrolyzed polyvinyl acetate with a weight ratio of fully to partially hydrolyzed polyvinyl acetate between about 1 to 10 and 10 to 1 and preferably between about 1 to 5 and 5 to 1. The mixture may be added to the emulsion as the pure polymer components, or alternatively may be added as an aqueous solution containing the hydrolyzed polyvinyl acetate mixture at the recited concentration and weight ratios.

The most effective of the fully hydrolyzed polyvinyl acetates are those which, when dissolved in water at 4 weight percent concentration, exhibit a viscosity of from 5 to 125 centipoises at a temperature of 20° C. as determined by the Hoeppler falling ball method. Exemplary of the fully hydrolyzed polyvinyl acetate components include GOHSENOL NL05, a low molecular weight fully hydrolyzed polyvinyl acetate marketed by Bently Chemical Corporation and ELVANOL 70–05, a low molecular weight, fully hydrolyzed polyvinyl acetate marketed by E. I. duPont de Nemours.

The most effective of the partially hydrolyzed polyvinyl acetates are those which are from 50 to 95, preferably from 80 to 95 percent and, most preferably, from 87 to 90 percent hydrolyzed, and which exhibit a viscosity between about 2 and 80 centipoises and preferably between 3 and 43 centipoises as determined by the Hoeppler falling ball method for a 4 percent aqueous solution at a temperature of 20° C. Exemplary of the partially hydrolyzed polyvinyl acetate component include ELVANOL 51–05, a low molecular weight, 87 to 89 percent hydrolyzed polyvinyl acetate, and ELVANOL 52–22, an intermediate molecular weight, 87 to 89 percent hydrolyzed polyvinyl acetate which are marketed by E. I. duPont de Nemours.

The total amount of vinyl acetate, polyvinyl alcohol and seed emulsion is selected so that the product emulsion has a solids content between about 25 and 70 weight percent and preferably between about 35 and 65 weight percent in order to realize an adhesive emulsion having the desired viscous properties. Emulsions having a solids content below 25 weight percent have too low of a viscosity for most commercial applications, while emulsions having a solids content greater than 70 weight percent tend to form separate phases upon standing and usually require application to the surfaces as a hot melt.

The copolymerization reaction in both the seed emulsion and final emulsion is initiated by a water soluble free radical initiator such as a water soluble peracid or salt thereof, e.g., hydrogen peroxide, sodium peroxide, lithium peroxide, peracetic acid, persulfuric acid or the ammonium and alkali metal salts thereof, e.g., ammonium persulfate, sodium peracetate, lithium persulfate, potassium persulfate, sodium persulfate, etc. A suitable concentration of the initiator is from 0.05 to 5.0 weight percent and preferably from 0.1 to 3 weight percent of the vinyl acetate monomer in the emulsion.

The free radical initiator can be used alone and thermally decomposed to release the free radical initiating species or can be used in combination with a suitable reducing agent in a redox couple. The reducing agent is typically an oxidizable sulfur compound such as an alkali metal metabisulfite or pyrosulfite, e.g., sodium metabisulfite, potassium metabisulfite, sodium pyrosulfite, etc. A particularly preferred reducing agent is sodium or potassium formaldehyde sulfoxylate such as, FORMOPON marketed by Rohm and Haas Company. The presence of the reducing agent in the polymerization medium achieves a release of free radicals at a lower temperature than necessary in its absence and thereby promotes formation of higher molecular weight copolymer products. The amount of reducing agent which can be employed throughout the copolymerization generally varies from about 0.1 to 3 weight percent of the amount of vinyl acetate monomer, however, in a preferred embodiment the reducing agent is only employed to initiate the reaction and hence is necessary only in small amounts which is generally between about 0.001 to 0.02 weight percent of vinyl acetate monomer to be polymerized.

Numerous buffering agents can be employed in the above mentioned polymerization reaction and these can generally comprise any water soluble additive capable of adjusting the pH of the water to the desired level while being relatively inert to the polymerization reaction. Exemplary buffer agents include ammonium and alkali metal salts of weak acids such as diammonium orthophosphate, tetrasodium pyrophosphate, sodium acetate, potassium acetate, etc. Alkali metal or ammonium carbonates and bicarbonates, such as sodium carbonate, sodium bicarbonate, potassium carbonate, potassium bicarbonate, etc., can also be employed.

In addition to the polyvinyl alcohol, vinyl acetate and seed emulsion, other additives may be included within the emulsion without substantially affecting its adhesive properties. One such additive is an emulsifying agent which may be employed to improve the emulsion stability and is especially advantageous when a high copolymer content is desired. The emulsifying agents can be nonionic, cationic or anionic, however, the anionic agents are preferred.

The concentration range of the total amount of emulsifying agents useful in the adhesive can be from 0.01 to 5 weight percent of the emulsion. It is recognized that the inclusion of emulsifying agents is not critical to the invention and they can be entirely eliminated.

In the following discussion of emulsifying agents, frequent reference will be made to the cloud point of a particular agent. The cloud points which are recited are based on 1 weight percent aqueous solutions of the agent. A relatively hydrophobic agent is one having a cloud point below 190° F. and a relatively hydrophilic agent is one having a cloud point of 190° F. or above.

A single emulsifying agent can be used or the emulsifying agents can be used in combination. When combinations of emulsifying agents are used, it is advantageous to use a relatively hydrophobic emulsifying agent in combination with a relatively hydrophilic agent.

Suitable nonionic emulsifying agents include polyoxyethylene condensates represented by the following general formula:

$$R(CH_2-CH_2-O)_nH$$

where R is the residue of a fatty alcohol, acid, amide, or amine having from 10 to 18 carbon atoms or an alkyl phenol having from 10 to 18 carbon atoms; and where $n$ is an integer of 1 or above and preferably between 5 and 30. Some specific examples of polyoxyethylene condensates which can be used include polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide and N-lauryl-N-polyoxyethylene amine and the like; and polyoxyethylene thioethers such as polyoxyethylene n-dodecyl thioether.

Some examples of nonionic emulsifying agents which can be used include a polyoxyethylene nonylphenyl ether having a cloud point of between 126° and 133° F. and marketed under the trademark "IGEPAL CO-630," and a polyoxyethylene nonylphenol ether having a cloud point above 212° F. and marketed under the trademark "IGEPAL CO-887." A similar polyoxyethylene nonylphenyl ether having a cloud point of about 86° F. is marketed under the trademark "IGEPAL CO-610"and is also a good emulsifying agent. Another agent is a polyoxyethylene octylphenyl ether having a cloud point of between 80° and 160° F. and marketed under the trademark "TRITON X-100." Other emulsifying agents include a polyoxyethylene oleyl ether having a cloud point of between 80° and 160° F. and marketed under the trademark "ATLAS G-3915,"and a polyoxyethylene lauryl ether having a cloud point above 190° F. and marketed under the trademark "BRIJ 35."

The nonionic emulsifying agents which can be used according to this invention also include a series of surface active agents known as "PLURONICS." The "PLURONICS" have the general formula:

$$HO(C_2H_4)_a(C_3H_6O)_b(C_2H_4O)_cH$$

where $a$, $b$ and $c$ are integers between 1 and about 100. As the ratio of $b$ to $a$ and $c$ increases, the compounds become less water soluble or more oil soluble and thus more hydrophobic, while as the ratio decreases the compounds become more water soluble and less oil soluble. An example of this class is "PLURONIC L-64" which has a cloud point of about 140° F. and a polyoxypropylene chain having a molecular weight of 1,500 to 1,800 and a polyoxyethylene content that is 40 to 50 percent of the total weight of the molecule. Another useful example is "PLUORNIC F-68," a polyoxyethylene-polyoxypropylene glycol having a cloud point of about 212° F. and a polyoxyethylene content of about 80 to 90 percent of the total weight of the molecule.

A class of highly suitable emulsifying agents are a series of ethylene oxide adducts of acetylenic glycols sold commercially under the name "SURFYNOLS." This class of compounds can be represented by the formula:

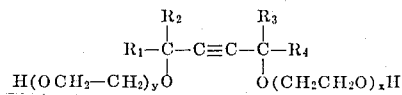

in which $R_1$ and $R_2$ are alkyl radicals containing from three to 10 carbon atoms, $R_2$ and $R_3$ are selected from the group consisting of methyl and ethyl, and $x$ and $y$ are integers having a sum in the range of 3 to 60, inclusive.

Representative of the "SURFYNOLS" are "SURFYNOL 465" which is an ethylene oxide adduct of 2,4,7,9-tetramethyl decynediol containing an average of 10 moles of ethylene oxide per mole of the surface active agent. "SURFYNOL 485" corresponds to "SURFYNOL 465" but contains an average of 30 moles of ethylene oxide per mole of surface active agent. "SURFYNOL 485" has a cloud point above 212° F.

Anionic emulsifying agents which can be employed herein include anionic compounds obtained by sulfonation of fatty derivatives such as sulfonated tallow, sulfonated vegetable oils and sulfonated marine animal oils. Commercially available emulsifiers of this group are TALLOSAN RC, a sulfonated tallow marketed by General Dyestuff Corporation; ACIDOLATE, a sulfonated oil marketed by White Laboratories, Inc.; and CHEMOIL 412, a sulfonated castor oil marketed by Standard Chemical Company.

Various sulfonated and sulfated fatty acid esters of mono- and polyvalent alcohols are also suitable such as NOPCO 2272R, a sulfated butyl ester of a fatty ester marketed by Nopco Chemical Company; NOPCO 1471, a sulfated vegetable oil marketed by Nopco Chemical Company; SANDOZOL N, a sulfated fatty ester marketed by Sandoz, Inc.; and STANTEX 322, an ester sulfate marketed by Standard Chemical Products, Inc.

Sulfated and sulfonated fatty alcohols are also useful as an emulsifier and include anionic agents such as DUPONAL ME, a sodium lauryl sulfate, DUPONAL L142, a sodium cetyl sulfate, DUPONAL LS, a sodium oleyl sulfate, which are marketed by E. I. duPont de Nemours and Company; and TERGITOL 4, a sodium sulfate derivative of 7-ethyl-2-methyl, 4-undecanol, TERGITOL 7, a sodium sulfate derivative of 3,9-diethyl tridecanol-6 and TERGITOL 08, a sodium sulfate derivative of 2-ethyl-1-hexanol, which are marketed by Union Carbide Corporation, Chemical Division.

Cationic emulsifiers can also be employed and include various amines such as ETHOQUAD C/12, ETHOQUAD O/25, ETHOQUAD 18/12 which are polyethoxylated quaternary ammonium salts marketed by Armor Industrial Chemical Company; INDULIN W—1, a lignin derivative marketed by West Virginia Pump and Paper Co.; KATAPOL VP–532 and KATAPOL PN–430 which are polyoxyethylated alkylamines marketed by General Aniline and Film Corporation; ROMINE O, an oleyl imidazoline marketed by Rozilda Laboratories, Inc.; TRITON X–400, a steryldimethylbenzyl ammonium chloride marketed by Rohm and Haas Company; VARIQUAT 638, K300 and L200 which are ethoxylated quaternary, dicoco dimethyl ammonium chloride and alkenyl trimethyl ammonium chloride, respectively, and marketed by Varney Chemical Corporation; and AMINE C, O, S. and T which are heterocyclic tertiary amines marketed by Geigy Industrial Chemicals.

Another additive which can be included within the adhesive emulsion is a plasticizer. The plasticizer does not substantially effect the adhesive properties of the emulsion and it can be employed in an amount from 0.01 to 10 weight percent of the total emulsion weight to impart a desired surface property to the adhesive. For example, in one aspect a plasticizer can increase the tackiness of adhesives obtained from the final emulsion product. Suitable plasticizers which may be employed herein include phthalate esters, such as, diethyl phthalate, di-2-ethylhexyl phthalate, di-capryl phthalate, di-lauryl phthalate, methylcyclohexyl phthalate, di-methoxyethyl phthalate, di-butoxyethyl phthalate, etc.; phosphoric acid derivatives, such as, trichlorethyl phosphate, tributyl phosphate, tri-2-ethylhexyl phosphate, tributylglycol phosphate, etc.; glycol derivatives, such as, polyethylene glycol 200–400 marketed by Carbide and Carbon Chemicals Corporation, triethyl citrate, acetyl triethyl citrate, butyl phthalyl butyl glycollate, dibutyloxalate, diamyloxalate, methyl-cyclohexanol oxalate, etc.; esters of adipic and sebacic acids, such as, dioctyl adipate, citratoxy ethyl adipate, di-hexyl sebacate, etc.; esters of abietic and ricinoleic acids, such as, methyl dihydroabietate, ethylene glycol diabietate, glyceryl monoricinoleate, ethyl glycol mono-methyl ether acetyl ricinoleate, etc.; and toluene sulfonic acid derivatives, such as, o- and p-toluene sulfonamide, p-toluene sulfanilide, etc.

Other types of plasticizers which can be employed herein include chlorinated diphenyls such as AROCLOR 1242, and extender type plasticizers such as the substituted biphenyls marketed by Monsanto Chemical Company under the trademark HB–40 and HB–20.

The following Table II briefly summarizes the components which make up the adhesive emulsion of this invention. The content ranges are expressed in weight percent of the product emulsion except as otherwise indicated.

TABLE II

Adhesive Compositions

| Component | Broad | Preferred | Most preferred |
|---|---|---|---|
| Seed Emulsion | 5–50 | 5–30 | 10–25 |
| Polyvinyl Alcohol mixture[1] | 1.5–6 | 2–5 | 2.5–4 |
|   Fully Hydrolyzed[2] | 10–90 | 20–80 | 30–70 |
|   Partially Hydrolyzed[3] | 10–90 | 80–20 | 70–30 |
| Vinyl Acetate Monomer[4] | 5–60 | 25–60 | 30–55 |
| Emulsifier | 0.01–5 | 0.1–2 | 0.1–1 |
| Plasticizer | 0.01–10 | 0.1–5 | 0.5–3 |
| Water | 75–30 | 65–35 | 60–40 |

(1) Designates the polyvinyl alcohol added to the final emulsion and does not include the partially hydrolyzed polyvinyl acetate present in the seed emulsion.
(2) The amount of fully hydrolyzed polyvinyl acetate in the polyvinyl alcohol mixture.
(3) The amount of partially hydrolyzed polyvinyl acetate in the polyvinyl alcohol mixture.
(4) The amount of vinyl acetate varies with the selected seed emulsion as shown in Table I.

COPOLYMERIZATION PROCEDURE

Various emulsion copolymerization techniques can be employed herein to obtain the desired copolymer, however it is preferred to conduct the polymerization reaction in a batch process using a kettle, and a stirrer to maintain intimate mixing of the emulsified reactants. The polymerization is started by charging water into the vessel along with an effective amount of a buffering agent to maintain the solution pH during polymerization between about 3 and 9, and preferably between about 4 and 8. When redox agents are employed, they can be charged to the reactor in the necessary quantities.

The reactor is purged several times with an inert gas such as nitrogen to evacuate all of the oxygen which may be present in the gas phase and thereafter purged with ethylene to obtain a relatively pure ethylene content in the gas phase at a pressure of from about 100 to 1,000 psig., and preferably from about 200 to 600 psig. It is recognized, however, that the presence of inert gases in the reactor does not render the invention inoperable, and the polymerization reaction may proceed even though the ethylene in the gas phase is diluted with inert vapors. After the reactor is purged it can then be charged with the polyvinyl alcohol mixture, the seed emulsion, emulsifier, the plasticizer, and vinyl acetate monomer and agitated to form an aqueous emulsion. It is preferred that only a small amount of the vinyl acetate monomer, such as, from 0.1 to 10 weight percent of the product emulsion and a small amount of the polyvinyl alcohol mixture, such as, from 0.01 to 1 weight percent of the emulsion be initially charged to the reactor with the seed emulsion, redox agent, and emulsifying agent, if one is employed, and that the remaining portion of vinyl acetate and polyvinyl alcohol mixture be slowly charged to reactor during the polymerization reaction so that substantial monomer addition may occur on primortal copolymers. In this manner it is possible to obtain copolymers in the final emulsion having a size from about 0.5 to 3 microns.

The polymerization initiator is charged to the reactor in an amount effective for polymerization, e.g., from about 0.05 to 5 weight percent based on the total vinyl acetate monomer maintained therein, and the reactor is heated to a temperature of from 100° to 160° F. and preferably between 110° to 145° F. to initiate the reaction. The initiator and reactant are stirred sufficiently to thoroughly agitate the contents of the reactor and to maintain the solids emulsified in the aqueous solution. After initiation of the reaction, the temperature of the emulsion is allowed to rise to between 160° and 185° F., and preferably between about 170° and 180° F., and maintained at the selected temperature by circulating a cooling liquid through the cooling jackets of the reactor. Preferably the bulk of the vinyl acetate and polyvinyl alcohol mixture (from 70 to 95 percent of each) is concurrently and slowly charged to the reactor with the proper amount of initiator after the emulsion temperature is maintained between about 160° and 185° F. When a redox agent is employed, the initiation and polymerization reaction can be conducted at lower temperatures and accordingly the reaction can be conducted at temperatures between about 100° and 160° F.

In a particularly preferred embodiment of the above polymerization procedure, the solids content in the reactor after the addition of the seed emulsion to the aqueous solution is adjusted to between about 15 and 30 weight percent prior to the addition of the initiator, vinyl acetate and polyvinyl alcohol. Also, the initiator, vinyl acetate, plasticizer and polyvinyl alcohol mixture are concurrently introduced into the reactor at slow addition rates, i.e., between about seven-eighths and one-fourth of the total amount of each additive is charged to the reactor per hour until all the initiator, vinyl acetate, plasticizer and hydrolyzed polyvinyl acetate are charged into the reactor.

The polymerization reaction is conducted until the free vinyl acetate monomer content in the emulsion is less than 1 weight percent and preferably less than 0.6 weight percent. In the event that the free monomer content is higher than the above concentrations after a reaction period of about 4 hours, an additional amount of initiator can be charged to the reactor to reduce the monomer content or, alternatively, the reaction temperature can be increased. The reactor is then cooled and depressured and the excess ethylene gas in the emulsion is removed. Instances where large batches of the adhesive emulsion is employed, it may be advantageous to introduce a defoaming agent into the emulsion during the degassing procedure to prevent a large froth or foam from developing on the emulsion surface.

The adhesive compositions made by the practice of this invention have particular utility in the adhesion of vinyl plastics to solid substrates or other vinyl plastics. The adhesive latex is applied to a surface of the vinyl plastic or a conjunctive surface of a solid substrate and the treated surface or surfaces are pressed together so that the latex is contiguous to both surfaces. The latex is allowed to cure for a sufficient period, such as, from 1 to 48 hours to form a laminated structure or article. Thus the adhesive latex of this invention can be used to form laminated articles comprising sheets of vinyl plastics or sheets of vinyl plastics and other solid substrates or alternatively, the adhesive latex can be used to adhere irregular shaped vinyl plastics, such as, tubes, etc., to solid structures. The amount of adhesive latex which is necessary in order to obtain the desired bond with the vinyl plastic varies greatly and depends upon the type and surface of the plastic employed as well as the necessary adhesive strength required. Generally, however, it is desired that the amount of latex employed will be sufficient to deposit a layer of adhesive which is from 1 to 50 mils and preferably from 4 to 20 mils in thickness.

The vinyl plastic which can be effectively employed herein, includes polyvinyl chloride, polyvinyl dichloride, polyvinyl fluoride, polyvinyl formal, polyvinylidene chloride, polyvinyl butyral, polystyrene, etc. and copolymers thereof and especially copolymers of polyvinyl chloride. Exemplary vinyl plastics which can be effectively employed herein include, SEILON CR100 and SEILON HI4000, a polyvinyl chloride marketed by Seilon Inc., TEDLAR 15 and TEDLAR 25, a polyvinyl fluoride marketed by DuPont de Nemours, and SEILON 3400 a polystyrene marketed by Seilon, Inc.

The adhesive latex can be successfully applied to any solid substrate, such as, wood, glass, concrete, metals, synthetic resins, etc., or any conventional support structure. The surface of the substrate can be relatively rough, smooth or highly polished, however, the adhesion will be better if the substrate surface is slightly rough. Thus in one embodiment of this invention, the adhesive latex can be employed to adhere a polyvinyl chloride sheet to a wooden or metal surface.

The invention is further illustrated by the following examples which are illustrative of specific modes of this invention and which are not intended as limiting the scope of the invention as defined by the appended claims.

EXAMPLES 1–7

In these examples, a series of tests are described which illustrate the effectiveness of the product emulsion to adhere to vinyl plastics. The tests also illustrate the effect of variations in the amount of polyvinyl alcohol, ethylene content and the seed emulsion on the adhesive properties of the product emulsion. In each test employing a seed emulsion, the seed emulsion is prepared by the following procedure. A 2 liter stainless steel pressure reactor equipped with a cooling jacket and a stirrer is charged with 360 grams of water, 2 grams of sodium bicarbonate, 0.1 gram of FORMOPON, a sodium formaldehyde sulfoxylate, and 54 grams of vinyl acetate. The contents of the reactor are stirred at ambient temperature until all of the bicarbonate is dissolved in the aqueous phase.

Oxygen is removed from the vapor space within the reactor by purging it three times with nitrogen at a pressure of 100 psig and then twice with ethylene at a pressure of 100 psig. The reactor is then pressured to 400 psig. with ethylene and the stirring rate is increased to about 500–700 rpm. Thereafter the contents are heated to 135° F., and 120 grams of an aqueous alcohol solution prepared by admixing 75 grams of water with varying amounts of partially hydrolyzed polyvinyl acetate is charged to the reactor. The contents are stirred at 700 rpm and the remainder of the aqueous polyvinyl alcohol solution along with about 4 grams of potassium persulfate is slowly charged to the reactor at a rate of about 122 grams per hour. The temperature of the reactor is allowed to rise to 175° F. at which time cooling water is circulated through the reactor jackets to maintain the reactor temperature at 175° F.

After the temperature is stabilized (approximately 15–30 minutes after the initial addition of the potassium persulfate), 540 grams of vinyl acetate is slowly charged to the reactor at a rate of about 370 grams per hour. The persulfate addition rate is adjusted so as to maintain about 3 weight percent free vinyl acetate monomer in the emulsion as determined by bromine titration of a small sample withdrawn from the reactor. The reaction conditions are maintained until the free monomer content of the emulsion is less than 5 weight percent. The reactor is then depressurized and cooled to ambient temperature.

The product emulsion is prepared by charging the reactor employed in preparing the seed emulsion with 150 grams of water, 2 grams of sodium bicarbonate, 0.1 grams of FORMOPON, 57 grams of vinyl acetate and 208 grams of the above described seed emulsion. The reactor contents are stirred at about 300 rpm at ambient temperature until all of the bicarbonate is dissolved in the aqueous phase. Oxygen is removed from the reactor by purging it three times with nitrogen at a pressure of 100 psig. and then twice with ethylene at a pressure of 100 psig. The reactor is then pressured to 400 psig. with ethylene and the stirring rate is increased to 500–700 rpm. The contents are heated to 135° F. and 15 grams of an aqueous polyvinyl alcohol mixture prepared by admixing 63 grams of water with varying amounts of fully hydrolyzed polyvinyl acetate and varying amounts of partially hydrolyzed polyvinyl acetate. The remainder of the polyvinyl alcohol solution plus about 4 grams of potassium persulfate are slowly charged to the reactor at a rate of about 230 grams per hour. The temperature of the reactor is allowed to rise to 175° F. at which time cooling water is circulated through the reactor jackets to maintain the reactor at that temperature.

After the temperature has stabilized (after approximately 15–30 minutes after the initial addition of the potassium persulfate) 580 grams of vinyl acetate is slowly charged to the reactor at the rate of about 390 grams per hour. The persulfate addition rate is adjusted during the polymerization reaction so as to maintain about 3 weight percent free vinyl acetate monomer in the emulsion as determined by bromine titration of a small amount withdrawn from the reactor.

The reaction conditions are maintained until the free vinyl acetate monomer content in the emulsion is less than 1 weight percent. The reactor is then depressured and its contents are cooled to ambient temperature.

A small sample of the seed and product emulsions are analyzed for their ethylene content and the product emulsion is subjected to a hot vinyl adhesion test. In the adhesion test a small amount of the emulsion is applied, at ambient temperatures, to one side of a 1-inch wide strip of unsupported plasticized polyvinylchloride sheet (6 mils thick) and the strip is pressed against a piece of plywood. The amount of adhesive employed is sufficient to obtain a 4-mil thick film of adhesive between the polyvinylchloride sheet and the plywood. The sample is cured at room temperature for a minimum period of 16 hours and thereafter is heated in an oven at 130° to 140° C. for 5 minutes. A strip of the vinyl film is initially peeled from the plywood for a distance of about one-fourth inch, and a 14 gram weight is hung on the peeled end of the hot vinyl strip. The sample is hung in a vertical position so that the attached weight will continue to peel the strip of vinyl from its plywood base. The time required to peel the vinyl strip 5.0 inches is selected to represent the strength time and the hot strength is calculated by multiplying the weight in grams of the attached weight by the time, in minutes, required to peel the strip 5 inches. The hot strength for various samples is determined and reported in Table III.

of the samples had excellent adhesion to the plywood and glass plate.

EXAMPLE 9

Several adhesive compositions are prepared in substantially the same procedure as disclosed in Examples 1–7. The solids content is varied from 40 to 65 weight percent, a plasticizer and an emulsifying agent are employed and are added to the reactor with the polyvinyl alcohol. The amount of seed emulsion and polyvinyl alcohol is also varied. These adhesives are presented in the following Table IV and have good adhesive properties.

TABLE IV

| Emulsion composition | Experimental compositions | | | | | | | | | |
|---|---|---|---|---|---|---|---|---|---|---|
| | 1 | 2 | 3 | 4 | 5 | 6 | 7 | 8 | 9 | 10 |
| Seed emulsion (wt. percent) | 5 | 5 | 10 | 10 | 10 | 10 | 20 | 20 | 20 | 20 |
| Elvanol 51-05 [1] | 1.0 | 1.0 | 2.0 | 2.0 | 2.0 | 2.0 | 2.0 | 2.0 | 2.0 | 5.0 |
| Polyvinyl alcohol (wt. percent): | | | | | | | | | | |
|   Elvanol 70-05 | 1.0 | 1.5 | 1.5 | 2 | 2 | 2 | 2 | 2 | 3 | 3 |
|   Elvanol 51-05 | 0.5 | 1 | 1 | 1 | 1 | 1 | 1 | 2 | 2 | 3 |
|   Elvanol 52-22 | | | | | 1 | | 2 | 1 | | |
| Plasticizer (wt. percent): | | | | | | | | | | |
|   Di-butoxyethyl phthalate | | 0.5 | | | | 1 | | 1 | | |
|   p-Toluene sulfonamide | | | | 0.5 | | | | 0.5 | | |
| Emulsifier (wt. percent): | | | | | | | | | | |
|   Igepal Co-630 | | | | | | | 1 | | | |
|   Pluronic L-64 | | | | | | 1 | | 1 | | 1.0 |
|   Surfynol 485 | | | | | | | | | 2 | 1.0 |
| Solids content (wt. percent) | 40 | 50 | 55 | 55 | 55 | 55 | 55 | 60 | 60 | 65 |

[1] Weight percent of seed emulsion.

The preceding examples are presented solely to illustrate the preferred mode of practice of the invention and to demonstrate results attained therewith. It is not intended that these examples be construed as unduly limiting of the invention but instead it is intended that the invention include the reagents and steps and their obvious equivalents set forth in the following claims.

TABLE III

| | Seed emulsion | | | | | Product emulsion | | | | | |
|---|---|---|---|---|---|---|---|---|---|---|---|
| | Partially hydrolyzed polyvinyl acetate | | Ethylene [2] (wt. percent) | Solids content (wt. percent) | Seed emulsion (wt. percent) | Polyvinyl alcohol component | | | | Ethylene [2] (wt. percent) | Hot (gram/ min.) |
| | | | | | | Fully hydrolyzed | | Partially hydrolyzed | | | |
| Example | Wt. percent | Trademark [1] | | | | Wt. percent | Trademark [1] | Wt. percent | Trademark [1] | | |
| 1 | 2.84 | Elvanol 51-05 | 16.9 | 48.3 | 20 | 2.18 | Elvanol 70-05 | 0.5 | Elvanol 51-05 | 15.1 | 665 |
| 2 | 2.84 | do | 8.2 | 48.3 | 20 | 2.18 | do | 0.5 | do | 15.7 | 1130 |
| 3 | 2.27 | do | 17.5 | 49.4 | 20 | 1.7 | do | 1.0 | do | 10.3 | 925 |
| 4 | 2.27 | do | 20 | 49.3 | 20 | 1.7 | do | 1.0 | do | 8.4 | 630 |
| 5 | 3.02 | do | 11.4 | 42.4 | 20 | 2.18 | do | 0 | | [3] 10 | 54 |
| 6 | | | | | 0 | 1.75 | do | {0.52 0.52} | {Elvanol 51-05 Elvanol 52-22} | 14.9 | 53 |
| 7 | | | | | 0 | 1.42 | do | 1.42 | Elvanol 51-05 | 17.9 | 165 |

[1] Marketed by duPont de Nemours.
[2] Ethylene content of ethylene-vinyl acetate copolymers.
[3] Estimated value.

It is apparent from the above table that the employment of a seed emulsion substantially increases the hot strength of the product emulsion from a value between 63 and 165 grams-minutes as demonstrated in Examples 6 and 7 to a value of from 630 to 1,130 gram minutes as demonstrated in Examples 1–4. It is also apparent that the addition of partially hydrolyzed polyvinyl acetate to the product emulsion substantially increases the hot strength from 54 gram-minutes as shown in Example 5 to the aforementioned high values of from 630 to 1,130 gram-minutes.

EXAMPLE 8

Samples of the adhesive emulsion prepared by the method of Examples 1–4 are respectively applies to one side of a separate glass plate and each plate is respectively pressed against a flat plywood surface. The amount of adhesive employed in each test is sufficient to obtain a 4 mil thick film of adhesive between the glass plate and the plywood. The samples are allowed to cure at room temperature for a minimum period of 16 hours and thereafter the adhesion of the glass plates to the respective pieces of plywood is measured. Each

I claim:

1. A process for the production of an adhesive emulsion which comprises:

emulsifying in an aqueous medium the following ingredients: (1) between about 5 and 50 weight percent based on said adhesive emulsion of an aqueous seed emulsion containing from 1 to 5 weight percent of partially hydrolyzed polyvinyl acetate having from 50 to 95 percent of its acetate groups hydrolyzed and from 25 to 65 weight percent of an ethylene vinyl acetate copolymer having from 1 to 20 weight percent ethylene, and (2) between about 0.1 and 5 weight percent of vinyl acetate;

contacting the emulsified mixture with from 0.05 to 5 weight percent of a polymerization initiator and ethylene at a pressure of from 100 to 1,000 psig and at a temperature sufficient to activate said initiator and cause a copolymerization of said vinyl acetate and ethylene;

introducing into contact with said emulsified mixture during said copolymerization (a) between about 1.5 and 6 weight percent based on said adhesive emulsion, of a polyvinyl alcohol mixture comprising fully hydrolyzed polyvinyl acetate and partially hydrolyzed polyvinyl acetate having from 50 to 95 percent of its acetate groups hydrolyzed with a weight ratio of fully to partially hydrolyzed polyvinyl acetate being between about 1 to 10 and 10 to 1 and (b) an additional amount of vinyl acetate so that the total amount of vinyl acetate added to the emulsified mixture during said copolymerization is from 5 to 60 weight percent.

2. The process defined in claim 1 wherein said partially hydrolyzed polyvinyl acetate in said seed emulsion and in said polyvinyl alcohol mixture is about 80 to 95 percent hydrolyzed and exhibits a viscosity of about 2 to 80 centipoises for a 4 weight percent aqueous solution at a temperature of 20° C.

3. The process defined in claim 1 wherein said fully hydrolyzed polyvinyl acetate exhibits a viscosity of from about 5 to 125 centipoises for a 4 weight percent aqueous solution at a temperature of 20° C.

4. The process defined in claim 1 wherein said weight ratio of fully to partially hydrolyzed polyvinyl alcohol is between about 1 to 5 and 5 to 1.

5. The process defined in claim 1 wherein about 0.01 and 5 weight percent of an emulsifying agent is also emulsified in said aqueous medium.

6. The process defined in claim 1 wherein about 0.01 and 10 weight percent of plasticizer is emulsified with said adhesive emulsion.

7. The product made by the process of claim 1.

8. A process for the production of an emulsion adhesive which comprises:
emulsifying in an aqueous medium having a pH of about 3 to 9 the following ingredients: (1) between about 5 to 50 weight percent of an aqueous seed emulsion comprising from 1 to 5 weight percent of partially hydrolyzed polyvinyl acetate having from 50 to 95 percent of its acetate groups hydrolyzed and from 25 to 65 weight percent of ethylene-vinyl acetate copolymers having about 1 to 20 weight percent ethylene, (2) between about 0.01 and 1 weight percent of a polyvinyl alcohol mixture comprising fully hydrolyzed polyvinyl acetate and partially hydrolyzed polyvinyl acetate having from 50 to 95 percent of its acetate groups hydrolyzed with a weight ratio of fully to partially hydrolyzed polyvinyl acetate between about 1 to 10 and 10 to 1, and (3) between about 0.1 and 5 weight percent of vinyl acetate monomer;

contacting the emulsified mixture with a water-soluble free radical polymerization initiator and ethylene at a pressure of from 100 to 1,000 psig. and maintaining the temperature of said emulsified mixture between about 100° and 200° F. to activate said initiator and copolymerize said ethylene and vinyl acetate;

slowly introducing into said emulsified mixture during said copolymerization an additional amount of vinyl acetate and said polyvinyl alcohol mixture so that the total amount of vinyl acetate added to the emulsified mixture is from about 5 to 60 weight percent and the total amount of polyvinyl alcohol mixture added to the emulsified mixture is from 1.5 to 6 weight percent; and maintaining copolymerization conditions until the free vinyl acetate monomer content of said emulsion is reduced to less than 1 weight percent.

9. The process defined in claim 8 wherein said partially hydrolyzed polyvinyl acetate in said seed emulsion and in said polyvinyl alcohol mixture is from about 80 to 95 percent hydrolyzed and exhibits a viscosity of about 2 to 80 centipoises for a 4 weight percent aqueous solution at a temperature of 20° C.

10. The process defined in claim 8 wherein said fully hydrolyzed polyvinyl acetate exhibits a viscosity of from about 5 to 125 centipoises for a 4 weight percent aqueous solution at a temperature of 20° C.

11. The process defined in claim 8 wherein said weight ratio of fully hydrolyzed to partially hydrolyzed polyvinyl acetate is between about 1 to 5 and 5 to 1.

12. The process defined in claim 8 wherein about 0.01 and 5 weight percent of an emulsifying agent is also emulsified in said aqueous medium.

13. The process defined in claim 8 wherein a redox agent is also emulsified in said aqueous medium.

14. An article of manufacture comprising a substrate having a solid surface, a vinyl plastic having a surface conjunctive with the solid surface of said substrate and adhered thereto by an adhesive interlayer formed from an ethylene-vinyl acetate adhesive emulsion prepared by the method of claim 1.

15. The article of claim 14 wherein said substrate is wood, glass, metal, concrete or a synthetic resin.

16. The article of claim 15 wherein said resin is polyvinyl chloride.

* * * * *